United States Patent
Dai (10) Patent No.: US 9,699,532 B2
(45) Date of Patent: Jul. 4, 2017

(54) SYSTEMS AND METHODS OF HYBRID DWDM AGGREGATION AND EXTENSION FOR TIME DIVISION MULTIPLEXING PASSIVE OPTICAL NETWORKS

(71) Applicant: COX COMMUNICATIONS, INC., Atlanta, GA (US)

(72) Inventor: Yuxin Dai, Santa Rosa, CA (US)

(73) Assignee: Cox Communications, Inc., Atlanta, GA (US)

( * ) Notice: Subject to any disclaimer, the term of this patent is extended or adjusted under 35 U.S.C. 154(b) by 357 days.

(21) Appl. No.: 13/838,102

(22) Filed: Mar. 15, 2013

(65) Prior Publication Data

US 2014/0270774 A1 Sep. 18, 2014

(51) Int. Cl.
*H04Q 11/00* (2006.01)
*H04J 14/02* (2006.01)

(52) U.S. Cl.
CPC ...... *H04Q 11/0067* (2013.01); *H04J 14/0282* (2013.01)

(58) Field of Classification Search
CPC ............................ H04J 14/0223; H04J 14/028
USPC .... 398/67, 34, 62, 64, 160, 173, 42, 43, 79, 398/83, 85, 97
See application file for complete search history.

(56) References Cited

U.S. PATENT DOCUMENTS

| 8,625,992 | B2 * | 1/2014 | Iannone | H04B 10/2503 398/82 |
| 2008/0089684 | A1 * | 4/2008 | Smith | H04B 10/2725 398/58 |
| 2010/0034538 | A1 * | 2/2010 | Estes | H04J 14/0206 398/83 |
| 2010/0266284 | A1 * | 10/2010 | Zhu | H04B 10/2503 398/72 |
| 2010/0266293 | A1 * | 10/2010 | Sone | H04B 10/2914 398/175 |
| 2011/0255860 | A1 * | 10/2011 | Lee | G01M 11/3136 398/12 |
| 2012/0148245 | A1 * | 6/2012 | Bowler | H04J 14/02 398/58 |

(Continued)

OTHER PUBLICATIONS

Peter Ossieur, Demonstration of a 32 512 Split, 100 km Reach, 2 32 10 Gb/s Hybrid DWDM-TDMA PON Using Tunable External Cavity Lasers in the ONUs,Journal of Lightwave Technology, vol. 29, No. 24, Dec. 15, 2011, pp. 3706-3709.*

(Continued)

*Primary Examiner* — David Payne
*Assistant Examiner* — Omar S Ismail
(74) *Attorney, Agent, or Firm* — Benjamin A. Balser; Next IP Law Group (57) ABSTRACT

Example embodiments of the systems and methods of hybrid DWDM aggregation and extension for time division multiplexing passive optical networks as disclosed herein solves problems facing cable operators and telecommunications operators by using WDM and DWDM technologies for time division multiplexing passive optical network aggregation and by extending the reach of the TDM PON beyond standard reach limits. An example system uses a downstream optical amplifier and an upstream repeater to extend the reach and for DWDM aggregation of the time division passive optical network.

20 Claims, 7 Drawing Sheets

(56) References Cited

U.S. PATENT DOCUMENTS

2012/0315047 A1* 12/2012 Iannone ............ H04B 10/2503
398/72
2013/0332978 A1* 12/2013 Rakib ................ H04N 21/6168
725/127

OTHER PUBLICATIONS

Peter Ossieur, Demonstration of a 32×512 Split, 100 km Reach, x 32×10 Gb/s Hybrid DWDM-TDMA PON Using Tunable External Cavity Lasers in the ONUs, Dec. 15, 2011, Journal of Lightwave Technology, vol. 29,No. 24.*
Peter Ossieur (NPL DOC. Demonstration of a 32 512 Split, 100 km Reach, 2×32×10 Gb/s Hybrid DWDM-TDMA PON Using Tunable External Cavity Lasers in the ONUs), Journal of Lightwave Technology, vol. 29, No. 24, Dec. 15, 2011.*

\* cited by examiner

SYSTEMS AND METHODS OF HYBRID DWDM AGGREGATION AND EXTENSION FOR TIME DIVISION MULTIPLEXING PASSIVE OPTICAL NETWORKS

TECHNICAL FIELD

The present disclosure is generally related to telecommunications and, more particularly, is related to optical networking.

BACKGROUND

A passive optical network (PON) is a point-to-multipoint, fiber-to-premises network architecture in which unpowered optical splitters are used to enable a single optical fiber to serve multiple premises, typically 16-128 premises. A PON may comprise an optical line terminal (OLT) at the service provider's central office and a number of optical network terminals (ONTs) near end users. A PON reduces the amount of fiber and central office equipment required compared with point-to-point architectures. A passive optical network is a form of fiber-optic access network.

In legacy TDM PON systems, downstream signals are broadcasted to all premises sharing multiple fibers. Upstream signals are combined using a multiple access protocol, usually time division multiple access (TDMA). The OLTs may "range" the ONTs in order to provide time slot assignments for upstream communication.

A PON takes advantage of wavelength division multiplexing (WDM), using one wavelength for downstream traffic and another for upstream traffic on a single non-zero dispersion-shifted fiber. Several protocols are implemented with the same basic wavelength plan and use the 1,490 nanometer (nm) wavelength for downstream traffic and 1310 nm wavelength for upstream traffic. 1550 nm is reserved for optional overlay services, typically RF (analog) video. There are heretofore unaddressed needs with previous optical networking solutions.

SUMMARY

Example embodiments of the present disclosure provide systems of hybrid DWDM aggregation and extension for time division multiplexing passive optical networks. Briefly described, in architecture, one example embodiment of the system, among of time division multiplexing passive optical networks s, can be implemented as follows: a first filter configured to receive a first signal from a first line and to filter off the optical signal; an amplifier configured to amplify the first signal; at least one second filter configured to receive the amplified first signal and separate the amplified first signal into individual wavelengths; at least one third filter configured to receive the individual wavelengths and to transmit the individual wavelengths to an optical splitter; and at least one upstream repeater configured to receive an upstream signal in a 1310 nm wavelength window from the at least one third filter and transmit the upstream signal in ITU-T C band, S band, or L band wavelengths to the first filter.

Embodiments of the present disclosure can also be viewed as providing methods for hybrid DWDM aggregation and extension for time division multiplexing passive optical networks. In this regard, one embodiment of such a method, among others, can be broadly summarized by the following steps: receiving a signal from an optical line terminal with a first filter; amplifying the received signal; transmitting the amplified signal to at least one second filter; transmitting the second filter signal to at least one third filter; transmitting the signal from the third filter to a splitter; transmitting a plurality of signals from the splitter to a plurality of optical network terminals; and repeating an output of the at least one third filter and transmitting the repeated signal in ITU-T C band, S band, or L band wavelengths to the first filter.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

A PON is typically comprised of a central office node, called an optical line terminal (OLT), one or more user nodes, called optical network units (ONUs) or optical network terminals (ONTs), and the fibers and splitters between them, called the optical distribution network (ODN). An ONU is a device that terminates the PON and presents customer service interfaces to the user. Some ONUs implement a separate subscriber unit to provide services such as telephony, Ethernet data, or video.

An OLT provides the interface between a PON and a service provider's core network. The ONT or ONU terminates the PON and presents the native service interfaces to the user. These services can include voice (plain old telephone service (POTS) or voice over IP (VoIP)), data (typically Ethernet), and video (IP multicast and/or 1550 nm RF video overlay). Often the ONU functions are separated into two parts: the ONU, which terminates the PON protocols; and network termination equipment (NTE), which presents a converged interface—such as Ethernet, coaxial cable—toward the user.

A PON is a shared network, in that the OLT sends a single stream of downstream traffic that is seen by all ONUs. Each ONU only reads the content of those packets that are addressed to it. Encryption may be used to prevent eavesdropping on downstream traffic.

The OLT is responsible for allocating upstream bandwidth to the ONUs. Because the optical distribution network (ODN) is shared, ONU upstream transmissions could collide if they were transmitted at random times. ONUs can lie at varying distances from the OLT, meaning that the transmission delay from each ONU is unique. The OLT may measure delay and set a register in each ONU via MPCP (multiple point control protocol) in EPON (Ethernet passive optical network) or PLOAM (physical layer operations and maintenance) in GPON (Gigabit passive optical network) messages to equalize its delay with respect to all of the other ONUs on the PON.

Once the delay of all ONUs has been set, the OLT transmits so-called gates in EPON or grants in GPON to the individual ONUs. A grant is permission to use a defined interval of time for upstream transmission. The grant map is dynamically re-calculated every few milliseconds. The map allocates bandwidth to all ONUs, such that each ONU receives timely bandwidth for its service needs.

Wavelength Division Multiplexing PON, or WDM-PON, is a non-standard type of passive optical networking. The multiple wavelengths of a WDM-PON can be used as point-to-point connections between OLT and WDM-PON ONU.

With WDM-PON, the MAC layer is simplified because the P2P connections between OLT and ONUs are realized in wavelength domain, so no P2MP media access control is needed. In WDM-PON, each wavelength can run at a different speed and protocol.

Due to the topology of PON, the transmission modes for downstream (from OLT to ONT) and upstream (from ONT to OLT) are different. For the downstream transmission, the OLT broadcasts optical signal to all the ONUs in continuous mode (CM), that is, the downstream channel always has optical data signal. However, in the upstream channel, ONUs can not transmit optical data signal in CM. Use of CM would result in all of the signals transmitted from the ONUs converging (with attenuation) into one fiber by the power splitter (serving as power coupler), and overlapping. To solve this problem, burst mode (BM) transmission is adopted for upstream channel. The given ONT only transmits an optical packet when it is allocated a time slot and it needs to transmit, and all the ONTs share the upstream channel in the time division multiplexing (TDM) mode.

Single-mode, passive optical components include branching devices such as Wavelength-Division Multiplexer/Demultiplexers—(WDMs), isolators, circulators, and filters. These components are used in interoffice, loop feeder, Fiber In The Loop (FITL), Hybrid Fiber-Coaxial Cable (HFC), Synchronous Optical Network (SONET), and Synchronous Digital Hierarchy (SDH) systems; and other telecommunications networks employing optical communications systems that utilize Optical Fiber Amplifiers (OFAs) and Dense Wavelength Division Multiplexer (DWDM) systems. The broad variety of passive optical components applications include multichannel transmission, distribution, optical taps for monitoring, pump combiners for fiber amplifiers, bit-rate limiters, optical connects, route diversity, polarization diversity, interferometers, and coherent communication.

WDMs are optical components in which power is split or combined based on the wavelength composition of the optical signal. Dense Wavelength Division Multiplexers (DWDMs) are optical components that split power over at least four wavelengths. Wavelength insensitive couplers are passive optical components in which power is split or combined independently of the wavelength composition of the optical signal. A given component may combine and divide optical signals simultaneously, as in bidirectional (duplex) transmission over a single fiber. Passive optical components are data format transparent, combining and dividing optical power in some predetermined ratio (coupling ratio) regardless of the information content of the signals. WDMs can be thought of as wavelength splitters and combiners. A fiber optic filter is a component with two or more ports that provides wavelength sensitive loss, isolation and/or return loss. Fiber optic filters are in-line, wavelength selective, components that allow a specific range of wavelengths to pass through (or reflect) with low attenuation for classification of filter types).

A Time Division Multiplexing (TDM) Passive Optical Network (PON), such as EPON (Ethernet Passive Optical Network), 10 G EPON, GPON (Gigabit Passive Optical Network), XG-PON (10 Gbit/s downstream and 2.5 Gbit/s upstream) and XG-PON2 (10 Gbit/s downstream and 10 Gbit/s upstream) have been deployed worldwide in the past decade. TDM PON is considered a main fiber access technology for FTTH (Fiber-to-the-home). In general, a TDM PON supports 16 or 32 Optical Network Terminals (ONT) and up to 20 km ODN (Optical Distribution Network) distance due to the limitations of an optical power budget.

Figure 1:
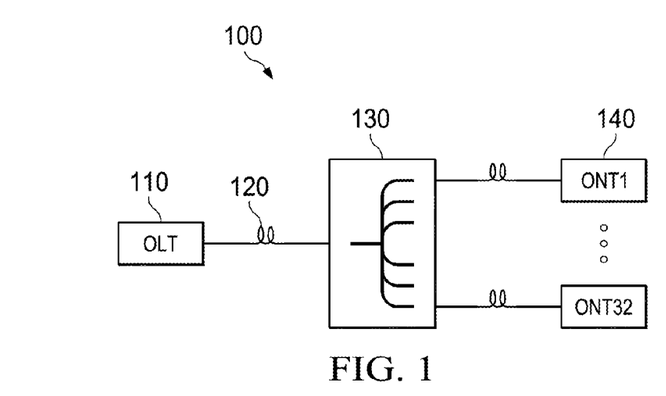
FIG. 1 is a system block diagram of an example of a TDM PON system.

FIG. 1 provides system of optical networking 100 using TDM-PON. OLT 110 sends a plurality of signals over fiber ODN 120 which is split by splitter 130 and sent to ONTs 140.

Figure 2:
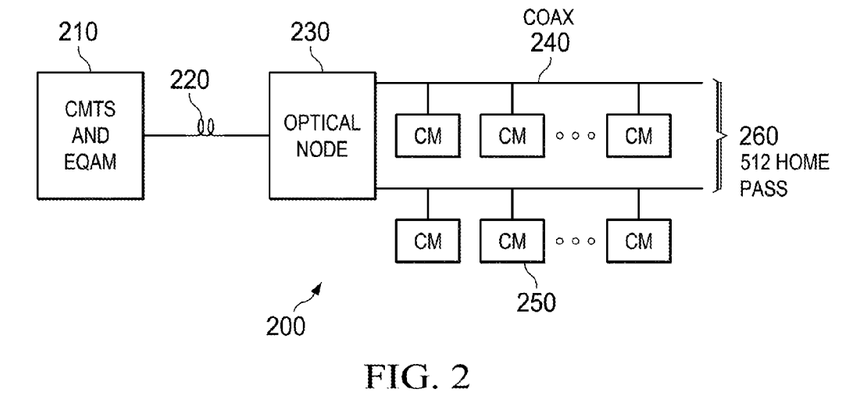
FIG. 2 is a system block diagram of an example of an HFC network.

Cable system operators typically use HFC (Hybrid Fiber Coax) network to deliver video, voice and data services to the end-users. FIG. 2 provides example HFC network 200. In HFC network 200, cable modem termination (CMTS) and edge quadrature amplitude modulator (eQAM) 210 send signals over fiber 220 to optical node 230 which converts the signals to be transmitted to cable modems 250 over coax 240. Optical fiber portion 220 of HFC network 200 may stretch more than 60 km in distance. This poses problems for cable operators to deploy TDM PON in their network. As the result, various TDM PON extension architect have been proposed. Generally speaking, there are two types of TDM PON extension architectures; one is all-optical and another is based on OEO (Optical-Electrical-Optical) conversions. Additionally, telecommunications operators also need longer reach TDM PON due to CO (Central Office) consolidations.

Figure 3:
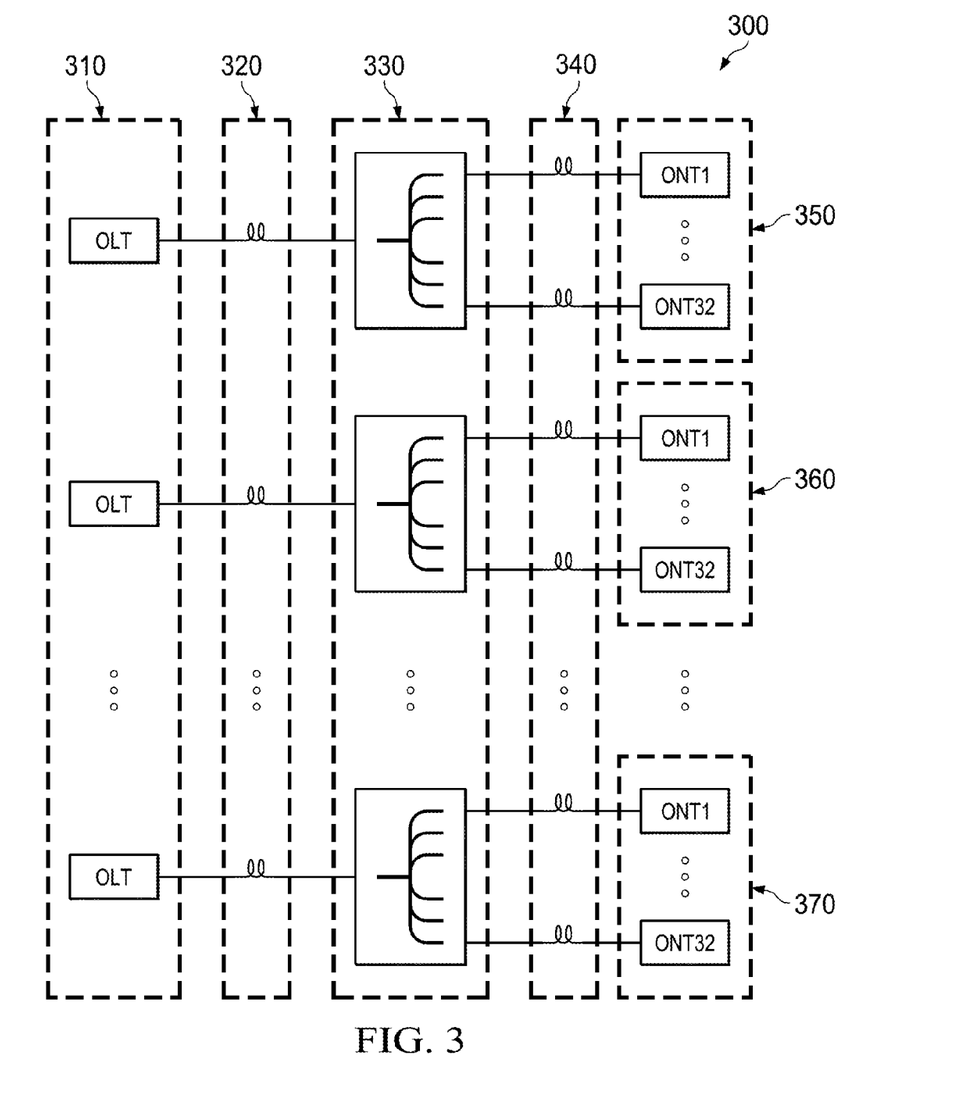
FIG. 3 is a system block diagram of an example of multiple TDM PON on fiber system overlays.

Another problem facing cable operators is shortage of trunk fibers. In an HFC network, an optical node normally supports 512 end-users. An optical node normally has two fiber feeds. When migrating to a TDM PON based FTTH, 16 TDM PONS are needed to support 512 end-uses. Clearly there is a shortage of fibers, especially trunk fibers. FIG. 3 provides system 300 with multiple TDM PON overlay on fibers, In system 300, multiple OLTs 310 send signals over fibers 320 to splitters 330, on through multiple fibers 340, and out to multiple ONTs 350, 360, . . . , and 370.

A TDM PON typically comprises a trunk from Head-end to the field where one or more optical splitters split the optical signal from an OLT into 16 or 32 portions at the branch fiber exchange. Normally, fiber shortage may be solved by WDM (Wavelength Division Multiplexing) or DWDM (Dense Wavelength Division Multiplexing) technologies. This solution may be referred to as WDM or DWDM aggregations. However, WDM or DWDM aggregations cannot be use directly on TDM PON. A DWDM filter has a narrow pass band. For example, for a 200 GHz DWDM filter, the pass band is +/−0.25 nm. The wavelength variation of a TDM PON ONT greatly exceeds the pass band of the DWDM filter. In an EPON example, the upstream wavelength range is from 1260 nm to 1360 nm. There is a clear need of DWDM aggregation of TDM PONs for both cable and Telco operators; however, it is still an unsolved problem for the industry.

Figure 4:
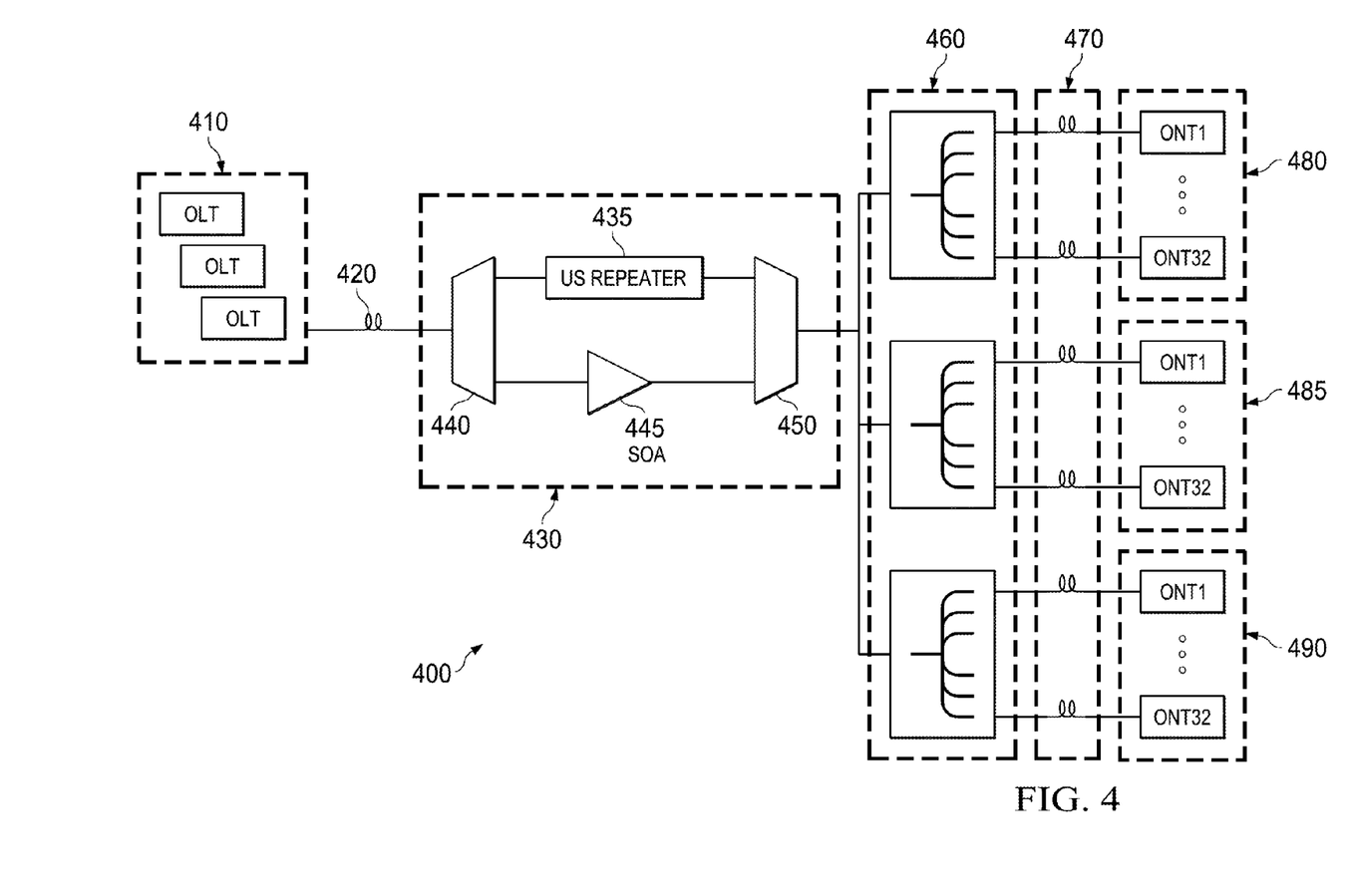
FIG. 4 is a system block diagram of an example embodiment of a system of hybrid DWDM aggregation and extension for time division multiplexing passive optical networks.

Example embodiments of the systems and methods of hybrid DWDM aggregation and extension for time division multiplexing passive optical networks as disclosed herein solves problems facing cable operators and telecommunications operators by using WDM and DWDM technologies for optical networking aggregation and by extending the reach of the optical networks beyond previous reach limits. FIG. 4 provides system 400 which uses a downstream amplifier and an upstream repeater to extend the reach of the fiber based optical network. OLTs 410 transmit signals over fiber 420 to aggregation and extension module 430. Aggregation and extension module 430 includes filter 440, upstream repeater 435, amplifier 445, and filter 450. Filter 440 is a duplex filter that splits the downstream signal off of fibers 420 and sends them to amplifier 445. Duplex filter 450 splits the upstream signal from splitters, multiplexer/demultiplexers 460, and sends them to upstream repeater 435. Duplex filter 440 sends the upstream signal from upstream repeater 435 onto fibers 420 to be sent back to OLTs 410. At the same time duplex filter 450 sends the signal from amplifier 445 to splitters, multiplexer/demultiplexers 460 to be sent over fibers 170 to ONTs 480, 485, and 490.

Example embodiments include downstream and upstream modules. In the downstream direction, optical amplifier 445, such as EDFA (Erbium Doped Optical Amplifier) or SOA (Semiconductor Optical Amplifier) may be used. EDFA and SOA 445 may amplify multiple wavelengths, so that one EDFA or SOA may be used to extend the reach of multiple down stream signals, for example 16 or 32 wavelengths in the C band—range from 1525 nm-1565 nm in ITU-T G.694.1. In the upstream direction OEO repeater 435 may be used for reach extension of multiple upstream signals as well as converging upstream wavelengths from the range of 1260 nm to 1360 nm to fit into a DWDM wavelength grid in C band or other bands.

Figure 5:
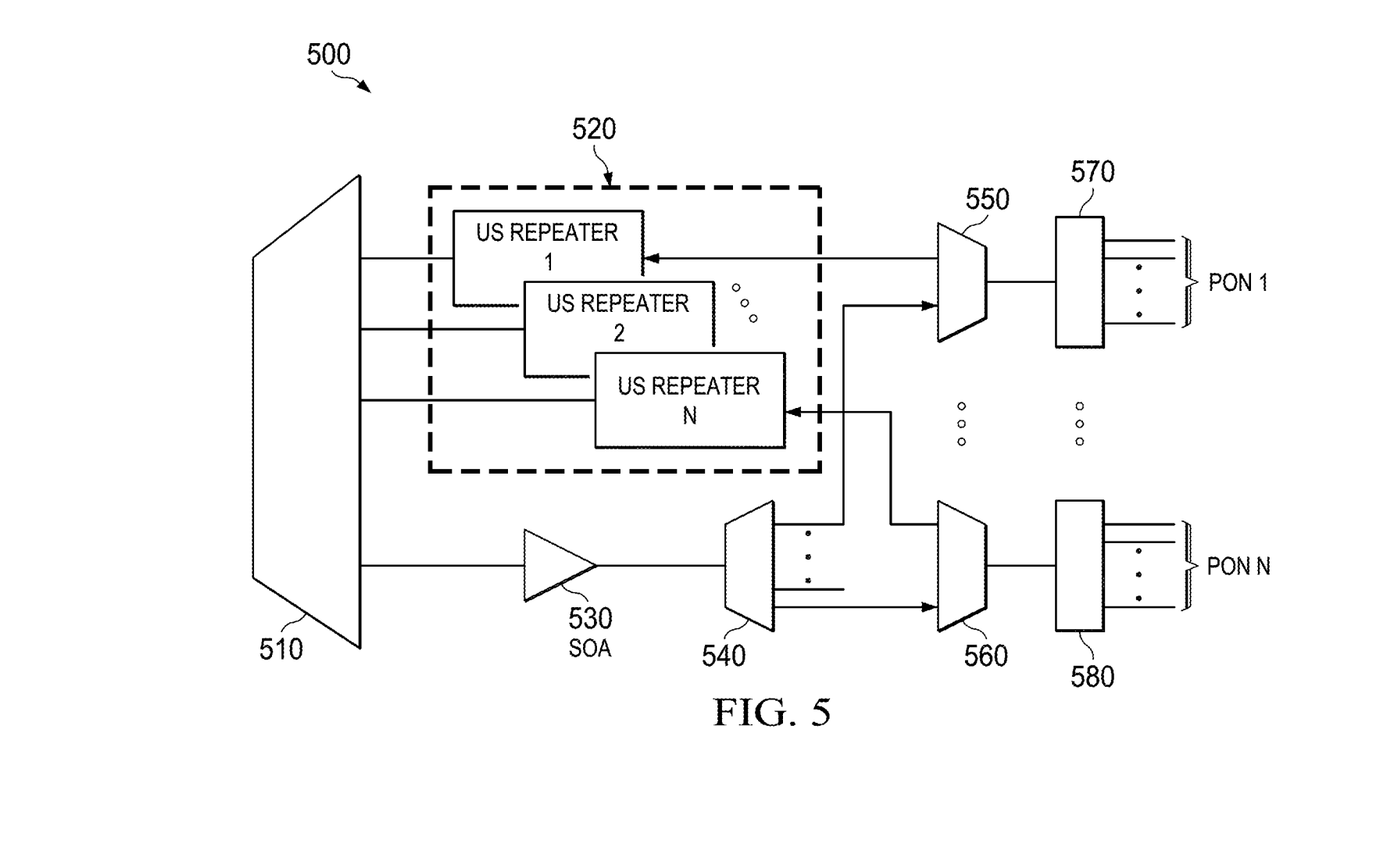
FIG. 5 is a system block diagram of an example embodiment of the system of FIG. 4 for multiple OLTs.

FIG. 5 provides an example embodiment of a system of hybrid DWDM aggregation and extension for time division multiplexing passive optical networks 500, and more specifically, example implementation hybrid WDM aggregation and extension for TDM PON architecture that supports multiple OLTs, for example, 16 OLTs or 32 OLTs. Each OLT may support multiple ONTs, for example, 16 ONTs, 32 ONTs or 64 ONTs.

In the downstream direction, optical signals from OLTs (not shown) comprise multiple wavelengths in the C band (or other bands), passing DWDM filter 510 (a band pass duplex filter), with entire wavelengths in C band, feed into SOA 530. The amplified optical signals that contain all the wavelengths from OLTs feed into DWDM filter 540 that separate the incoming wavelengths into individual wavelengths that are in the C band range. One of the downstream wavelengths from DWDM filter 540 feed into WDM filter 550 that feeds to an associated optical splitter 570 that is connected to 32 ONTs (not shown) in a first PON. Another output from DWDM filter 540 feeds into WDM filter 560 that feeds to optical splitter 580 that is connected to another set of 32 ONTs (not shown) in a PON n, where n is the number of TDM PONS supported in the system, for example 8, 16, 32, 64 . . . .

Aforementioned DWDM filter 510 combines multiple upstream wavelengths in C band, for example from ITU grid channel 33 (1550.92 nm) to channel 1 (1577.03 nm) in 50 GHz, 100 GHz spacing or 200 GHz spacing, and sends them upstream to the trunk fiber. In the downstream direction, DWDM filter 510 receives downstream DWDM wavelengths from OLTs in the head-end, for example from ITU grid channel 35 (1549.32 nm) to channel 72 (1520.25 nm) in 50 GHz, 100 GHz or 200 GHz spacing, and forwards all the downstream wavelengths to an output port without demultiplexing them into individual wavelengths. DWDM filter 540 separates the C band wavelengths received from DWDM filter 510 into individual wavelengths, ranging from ITU grid channel 35 (1549.32 nm) to channel 72 (1520.25 nm) in 50 GHz, 100 GHz or 200 GHz spacing, to output ports.

In the upstream direction, the upstream optical signal from a TDM PON, ranging from 1260 nm to 1360 nm in case of EPON, for example PON 1, is separated by WDM band pass filter 550 and feed into one of upstream repeaters 520. At upstream repeater 520 the upstream optical signal in 1310 nm range is converged into an electrical signal and processed accordingly, and then converted back to an optical signal but to one of a C band ITU grid wavelengths different from that of repeater 1 in the previous example, for example, from ITU grid channel 33 (1550.92 nm) to channel 1 (1577.03 nm) in 50 GHz, 100 GHz spacing, or 200 GHz spacing.

The upstream optical signal ranging from 1260 nm to 1360 nm from a TDM PON, for example PON n, separated by WDM band pass filter n 560 and feed into an upstream repeater n of upstream repeaters 520. At upstream repeater n, the upstream optical single in 1310 nm ranges is converted into an electrical single and processed accordingly, and then converted back to an optical signal, but to a C band ITU grid wavelengths, for example, from ITU grid channel 33 (1550.92 nm) to channel 1 (1577.03 nm) in 50 GHz, 100 GHz spacing or 200 GHz spacing.

The output of optical signals from upstream repeater 1 to repeater n of upstream repeaters 520 in the range of C band ITU grid wavelengths, for example, from ITU grid channel 33 (1550.92 nm) to channel 1 (1577.03 nm) in 50 GHz, 100 GHz spacing or 200 GHz spacing, are combined by a DWDM filter 510 and then sent upstream via a single fiber to the head-end (not shown). WDM filter 550 and WDM filter 560 are band-pass duplex filters that separate 1310 nm band from C band. At the head-end (not shown), the upstream multiple optical signals, for example, from ITU grid channel 35 (1549.32 nm) to channel 72 (1520.25 nm) in 50 GHz, 100 GHz spacing or 200 GHz spacing in C band, are separated by a DWDM filter and fed into individual OLTs.

The downstream wavelengths could also be in other ITU grid wavelength bands, for example, S band ranging from 1529.55 nm to 1492.24 nm in 50 GHz, 100 GHz or 200 GHz spacing, or L band ranging from 1611.78 nm to 1570.41 in 50 GHz, 100 GHz or 200 GHz spacing. The architecture shown in system 500 may be applied to EPON, GPON, 10 G EPON and XG-PON, among other protocols. The upstream repeater blocks 520 may be different for different TDM PON protocols. For example, the detail structure in upstream repeater blocks for EPON will be different from that of GPON, etc.

Figure 6:
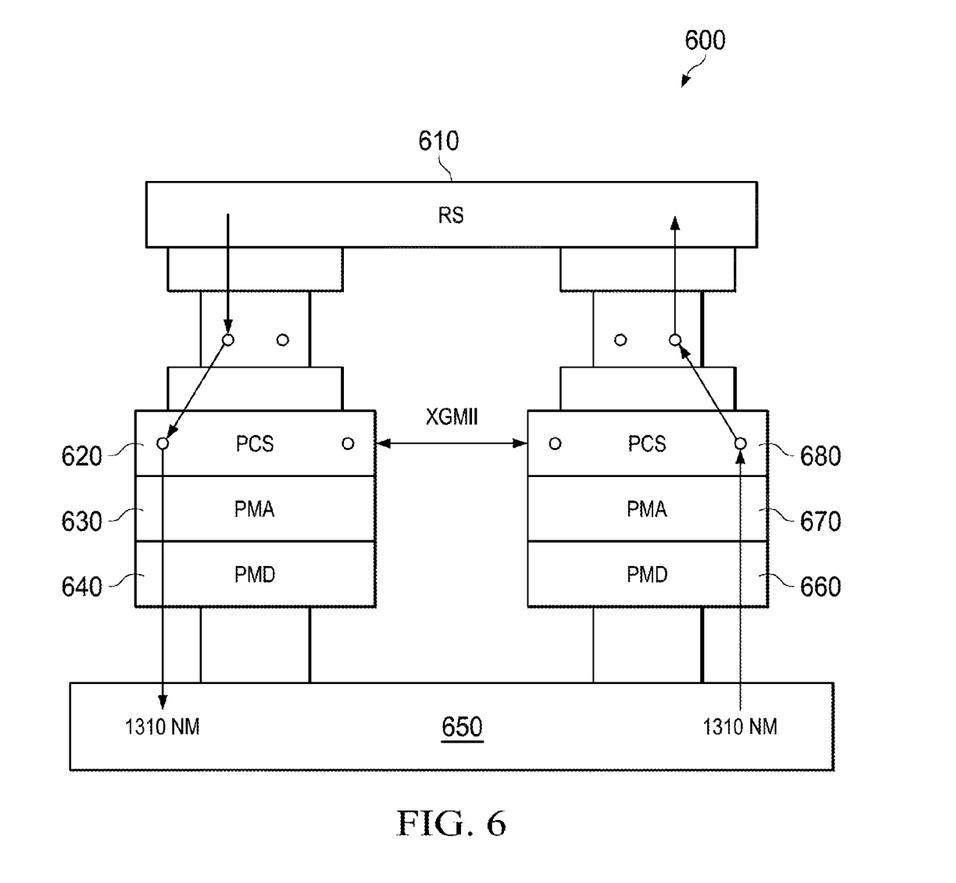
FIG. 6 is a system block diagram of an example embodiment of the upstream repeater of FIG. 5.

In FIG. 6, the upstream signals from a plurality of ONUs in at least one EPON are decoded into electrical signals while passing through PMD (Physical Media Dependent) 640, 660 and PMA (Physical Media Attachment) 630, 670 layers. At PCS layer 620, 680, the received electrical signals are decoded and then forward to RS (Reconciliation) layer 610, via XGMII interface, where Ethernet frames can be extracted. The repeat function could be implemented at RS layer 610 or PCS layer 620, 680. These are standard methods for EPON.

Figure 7:
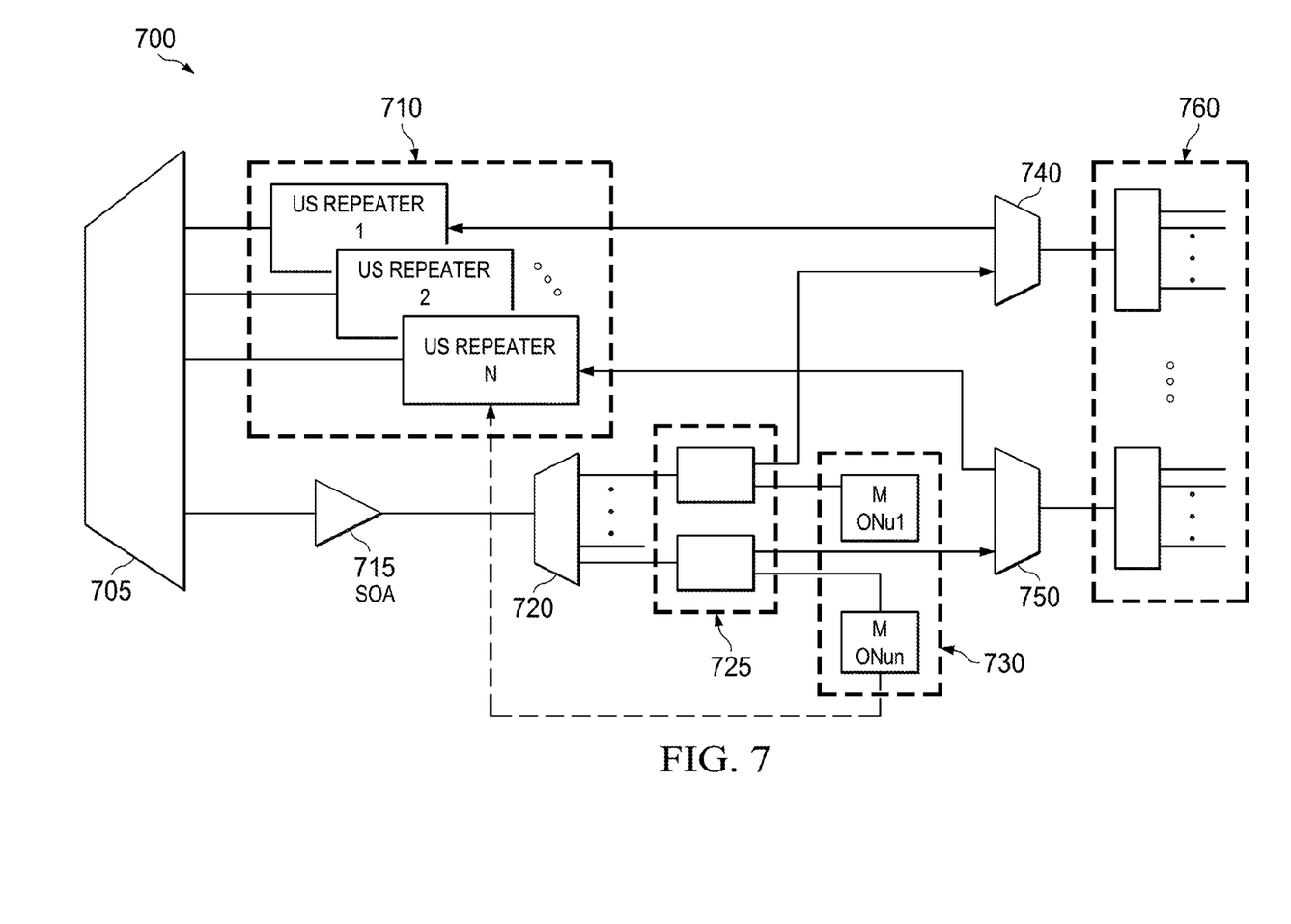
FIG. 7 is a system block diagram of an example embodiment of the system of FIG. 5 with management ONU capability.

FIG. 7 provides system diagram 700 in which management ONUs (M ONUs) 730 are added to PON1, PON2, . . . PONn for time synchronization of upstream repeaters 710. Upstream repeater 710 may use time synchronization information for a corresponding OLT. If time synchronization is used, management ONU 730 may extract time information from the downstream signal and feed the time information to corresponding upstream repeater 710.

A small portion (for example, less than 5%) of the optical signal is dropped from the downstream optical signal by 1×2 splitter 725 and fed into corresponding management ONU 730, for example MONU 1. MONU 1 then decodes the optical signal, extracts the time information, and feeds the synchronized time information to corresponding upstream repeater 710. The architecture provided in system 700 may be applied to EPON, 10 G EPON, GPON and XG-PON systems, among others.

Figure 8:
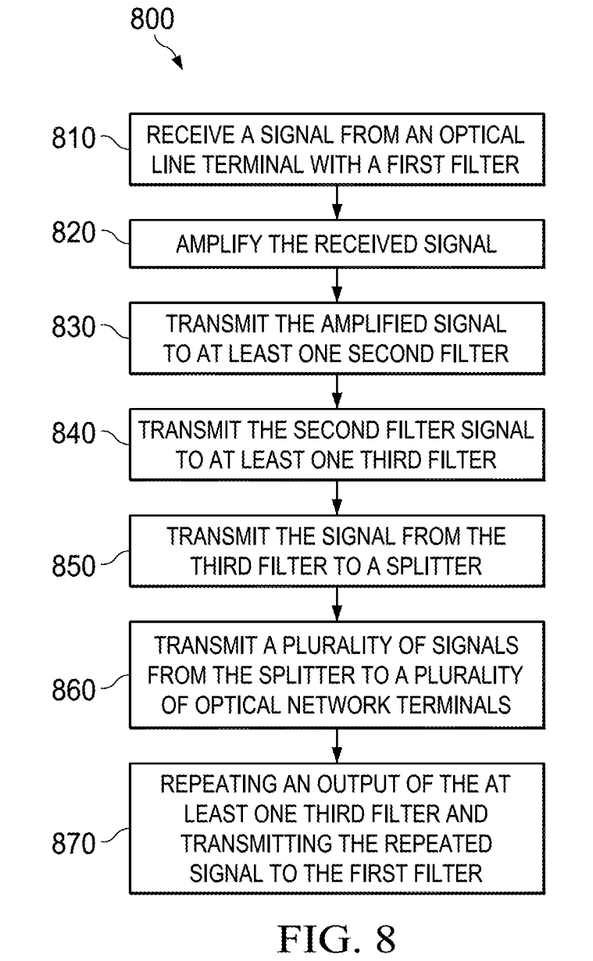
FIG. 8 is a flow diagram of an example embodiment of a method of hybrid DWDM aggregation and extension for time division multiplexing passive optical networks.

FIG. 8 provides flowchart 800 of an example embodiment of a method of hybrid DWDM aggregation and extension for time division optical networks. In block 810, a signal is received from an optical line terminal with a first filter. In block 820, the received signal is amplified. In block 830, the amplified signal is transmitted to at least one second filter. In block 840, the second filter signal is transmitted to at least one third filter. In block 850, the signal from the third filter is transmitted to a splitter. In block 860, a plurality of signals is transmitted from the splitter to a plurality of optical network terminals. In block 870, an output of the at least one third filter in wavelength range in a 1310 nm window is repeated and the repeated signal is transmitted at ITU-T C band, S band, or L band DWDM wavelengths.

Although the present invention has been described in detail, it should be understood that various changes, substitutions and alterations can be made thereto without departing from the spirit and scope of the invention as defined by the appended claims.

Therefore, at least the following is claimed:
1. A system comprising:
   a first dense wavelength division multiplexing (DWDM) filter configured to receive a first downstream signal from a first line and to filter off the optical signal;
   an amplifier configured to amplify the first downstream signal;
   at least one second downstream DWDM filter configured to receive the amplified first downstream signal and separate the amplified first downstream signal into individual downstream wavelengths;
   a plurality of third wavelength division multiplexing (WDM) filters configured to receive the individual downstream wavelengths separated by the at least one second downstream DWDM filter and to transmit the individual downstream wavelengths to an optical splitter;
   a plurality of upstream repeaters configured to receive a plurality of upstream signals from the plurality of third WDM filters and transmit the plurality of upstream signals to the first DWDM filter, the first DWDM filter further configured to combine the plurality of upstream signals for upstream transmission on a single fiber; and
   at least one splitter and management optical network unit configured to receive a signal from the at least one second filter to decode the optical signal, extract time information and transmit synchronization time information to at least one of the plurality of upstream repeaters.

2. The system of claim 1, wherein the first signal comprises multiple downstream optical signals from multiple OLTs in the central office or head end.

3. The system of claim 2, wherein the wavelengths of the multiple downstream optical signals are in the ITU-T C band.

4. The system of claim 1, wherein the amplifier comprises at least one of a semiconductor optical amplifier and/or an erbium doped optical amplifier.

5. The system of claim 1, wherein the DWDM filters band pass filters.

6. The system of claim 1, wherein the at least one first DWDM filter passes the entire C band without further de-multiplexing the C band wavelengths into individual wavelengths.

7. The system of claim 1, wherein the at least one second DWDM filter multiplexes individual wavelengths in the C band to the upstream port.

8. The system of claim 1, wherein the at least one second downstream DWDM filter comprises a dense wavelength division multiplexing filter.

9. The system of claim 1, wherein the at least one second downstream DWDM filter demultiplexes the optical signal into individual wavelengths.

10. The system of claim 1, wherein each of the plurality of third filters separates an ITU-T C band optical signal from a 1310 nm optical signal.

11. The system of claim 1, wherein each of the plurality of upstream repeaters comprises at least one of an EPON upstream repeater, a 10G EPON upstream repeater, a GPON upstream repeater, and an XGPON upstream repeater.

12. The system of claim 1, wherein each of the plurality of upstream repeaters receives an optical signal from a plurality of ONUs from a TDM PON in the wavelength range in the 1310 nm window and converts the optical signal to a ITU-T C band wavelength.

13. The system of claim 1, wherein each of the plurality of upstream repeaters, repeater 1 to repeater n, is configured to:
   receive optical signals from TDM PON 1 to TDM PON n, where n is the number of TDM PONs;
   convert the received optical signals to electrical signals;
   process the converted signals in an electrical domain; and
   convert the electrical signals into corresponding optical signals in ITU-T C band, S band, or L band wavelengths for DWDM aggregation in the upstream direction.

14. The system of claim 1, further comprising a plurality of splitters configured to receive an output from the plurality of third WDM filters and output signals to a plurality of optical network terminals.

15. The system of claim 1, wherein the system comprises at least one of an Ethernet passive optical network (EPON), a 10 gigabit per second EPON, a gigabit passive optical network, and an XG passive optical network.

16. A method comprising
   receiving a downstream signal from an optical line terminal with a first dense wavelength division multiplexing (DWDM) filter;
   amplifying the received downstream signal;
   transmitting the amplified downstream signal to at least one second DWDM filter;

transmitting the second downstream DWDM filter signal to a plurality of third wavelength division multiplexing (WDM) filters;

transmitting the downstream signal from each of the third WDM filters to a plurality of splitters;

transmitting a plurality of downstream signals from each of the plurality of splitters to a plurality of optical network terminals;

repeating an upstream output of each of the plurality of third WDM filters;

converting the optical signals from the plurality of third WDM filters into electrical signals;

processing the electrical signals according to protocols of the electrical signals;

converting the electrical signals into optical signals in an ITU C band wavelength;

transmitting the optical signals to the first DWDM filter;

combining the optical signals by the first DWDM filter for upstream transmission on a single fiber and receiving a signal from the at least one second filter by a management optical network unit;

decoding the signal;

extracting time information; and transmitting synchronized time information to at least one of the plurality of upstream repeaters.

17. The method of claim 16, wherein the amplifier comprises at least one of a semiconductor optical amplifier and an erbium doped optical amplifier.

18. The method of claim 16, further comprising converting signals from optical signals to electrical signals with a plurality of upstream repeaters.

19. The method of claim 16, further comprising receiving optical signals in a 1310 nm window by plurality of upstream repeaters and outputting optical signals in one of an ITC C band, S band, and L band.

20. A system for extending the reach of and aggregating a TDM PON comprising:

an optical amplifier for amplifying downstream signals;

a plurality of upstream repeaters 1 to n, each upstream repeater comprising an optical-electrical-optical repeater and wavelength converter, the plurality of upstream repeaters configured to:
- receive optical signals from TDM PON 1 to TDM PON n, where n is the number of TDM PONs;
- convert the received optical signals to electrical signals;
- process the converted signals in an electrical domain; and
- convert the electrical signals into corresponding optical signals in ITU-T C band, S band, or L band wavelengths for DWDM aggregation in the upstream direction; and at least one splitter and management optical network unit configured to receive a signal from the at least one second filter to decode the optical signal, extract time information and transmit synchronization time information to at least one of the plurality of upstream repeaters.

* * * * *